United States Patent [19]
Hohensee et al.

[11] Patent Number: 5,727,220
[45] Date of Patent: Mar. 10, 1998

[54] METHOD AND SYSTEM FOR CACHING AND REFERENCING CACHED DOCUMENT PAGES UTILIZING A PRESENTATION DATA STREAM

[75] Inventors: Reinhard H. Hohensee, Boulder; David E. Stone, Longmont; Ronald D. Parrish, Niwot; Dwight R. Palmer, Longmont; Steven M. Scott, Lafayette; Brian G. Platte, Frisco, all of Colo.

[73] Assignee: International Business Machines Corporation, Armonk, N.Y.

[21] Appl. No.: 564,756

[22] Filed: Nov. 29, 1995

[51] Int. Cl.$^6$ ........................ G06F 9/00
[52] U.S. Cl. .................. 395/774; 395/133; 395/445
[58] Field of Search ............... 395/774, 776, 395/792, 793, 335, 114, 115, 133, 445

[56] References Cited

U.S. PATENT DOCUMENTS

| | | | |
|---|---|---|---|
| 4,713,754 | 12/1987 | Agarwal et al. | 395/611 |
| 5,041,918 | 8/1991 | Ishida et al. | 358/442 |
| 5,131,053 | 7/1992 | Bernzott et al. | 382/176 |
| 5,172,422 | 12/1992 | Tan | 382/174 |
| 5,276,835 | 1/1994 | Mohan et al. | 395/471 |
| 5,287,473 | 2/1994 | Mohan et al. | 395/460 |
| 5,297,265 | 3/1994 | Frank et al. | 395/412 |
| 5,353,388 | 10/1994 | Motoyama | 395/117 |
| 5,386,526 | 1/1995 | Mitra et al. | 395/403 |
| 5,404,489 | 4/1995 | Woods et al. | 395/479 |
| 5,436,983 | 7/1995 | Bernzott et al. | 382/229 |
| 5,455,599 | 10/1995 | Cabral et al. | 345/133 |
| 5,469,533 | 11/1995 | Dennis | 395/114 |
| 5,530,799 | 6/1996 | Marsh et al. | 395/507 |
| 5,608,542 | 3/1997 | Krahe et al. | 358/449 |
| 5,613,124 | 3/1997 | Atkinson et al. | 395/133 |
| 5,625,711 | 4/1997 | Nicholson et al. | 382/224 |

FOREIGN PATENT DOCUMENTS 0 609 975 A2  8/1994  European Pat. Off.

*Primary Examiner*—Joseph H. Feild
*Assistant Examiner*—Stephen Hong
*Attorney, Agent, or Firm*—Bradley, Gunter & Dillion, LLP

[57] ABSTRACT

A method and system for presenting a document at a presentation device utilizing a presentation data stream having a continuous ordered stream of uniquely identified data objects and associated elements which specify format and presentation parameters for each of those data objects. The data stream contains a plurality of documents, including a resource document and a presentation document, which each comprise a collection of the uniquely identified data objects and associated elements. A save object command structure is defined within a resource document within the presentation data stream. Within the save object command structure, a particular data object is identified. In response to receipt of the save object command structure at the presentation device, the particular data object is stored within storage media. Thereafter, an include saved object command structure is defined within a diverse presentation document within a presentation data stream. The particular data object is identified within the include saved object command structure. In response to receipt of the include saved object command structure at the presentation device, the particular data object is presented within the presentation document, thereby enabling a portion of the resource document stored at the presentation device to be utilized within the presentation document such that presentation efficiency is enhanced.

22 Claims, 11 Drawing Sheets

Fig. 2

IPG (X'D3AFAF') Syntax

40 — Structured Field Introducer | Structured Field Data

| SF Length | ID = X'D3AFAF' | Flags | Reserved X'0000' |
|---|---|---|---|

42 —

| Offset | Type | Name | Range | Meaning | M/O | Exc |
|---|---|---|---|---|---|---|
| 0-7 | CHAR | PgName | | Name of the page | M | X'06' |
| 8-15 | | | | Reserved | M | X'06' |
| 16 | BITS | IPgFlgs | | Specify control information for the included page. | M | X'02' |
| 17-n | | Triplets | | | O | X'10' |

Fig. 5

MPG (X'D3ABAF') Syntax

50 — Structured Field Introducer | Structured Field Data

| SF Length | ID = X'D3ABAF' | Flags | Reserved X'0000' |
|---|---|---|---|

52 —

| Offset | Type | Name | Range | Meaning | M/O | Exc |
|---|---|---|---|---|---|---|
| | | | | One repeating group in the following format: | | |
| 0-1 | UBIN | RGLength | 12-(n+1) | Total length of this repeating group | M | X'06' |
| 2-n | | Triplets | | | M | X'14' |

```
Document Structure

Begin Document (BDT, D3A8A8)
    [  (       D3...A7 )       Document Index
    +  ( IMM,  D3ABCC )  (s)]  Invoke Medium Map
    +  ( IPG,  D3AFAF )  (s)]  Include Page
    +  ( LLE,  D3B490 )  (s)]  Link Logical Element
    +  (       D3...CC )  (s)]  Medium Map
    +  (       D3...AF )  (s)]  Page
    +  (       D3...AD )  (s)]  Page Group
End Document (EDT, D3A9A8)
```

Fig. 3A

```
Page Group Structure

Begin Named Page Group (BNG, D3A8AD)
    [  ( TLE,  D3A090 )  (s)]  Tag Logical Element
    +  ( IMM,  D3ABCC )  (s)]  Invoke Medium Map
    +  ( IPG,  D3AFAF )  (s)]  Include Page
    +  ( LLE,  D3B490 )  (s)]  Link Logical Element
    +  (       D3...CC )  (s)]  Medium Map
    +  (       D3...AF )  (s)]  Page
    +  (       D3...AD )  (s)]  Page Group
End Named Page Group (ENG, D3A9AD)
```

Fig. 3B

Page Structure

```
Begin Page (BPG, D3A8AF)
[        D3...C6)       Resource Group              ]
[        D3...C9)       Active Environment Group    ]
+ [ (LLE, D3B490)       Link Logical Element    (S) ]
+ [ (TLE, D3A090)       Tag Logical Element     (S) ]
+ [        D3...EB)     Bar Code Object         (S) ]
+ [        D3...BB)     Graphics Object         (S) ]
+ [        D3...FB)     Image Object            (S) ]
+ [        D3...9B)     Presentation Text Object (S)]
+ [        D3...92)     Object Container        (S) ]
+ [ (IOB,  D3AFC3)      Include Object          (S) ]
+ [ (IPG,  D3AFAF)      Include Page                ]
+ [ (IPO,  D3AFD8)      Include Page Overlay    (S) ]
+ [ (IPS,  D3AF5F)      Include Page Segment    (S) ]
End Page (EPG, D3A9AF)
```

*Fig. 3C*

Active Environment Group (AEG)

```
Begin Active Environment Group (BAG, D3A8C9)
[ (MCF, D3AB8A)    Map Coded Font              F2 (S) ]
[ (MPG, D3ABAF)    Map Page                    F2     ]
[ (MPO, D3ABD8)    Map Page Overlay               (S) ]
[ (MPS, D3B15F)    Map Page Segment               (S) ]
[ (PGD, D3A6AF)    Page Descriptor                    ]
[ (OBD, D3A66B)    Object Area Descriptor             ]
[ (OBP, D3AC6B)    Object Area Position               ]
[ (PTD, D3B19B)    Presentation Text Data Descriptor F2 ]
End Active Environment Group (EAG, D3A9C9)
```

*Fig. 4*

External Resource Group Structure

Begin Resource Group (BRG, D3A8C6)

+    ( D3..EB )    Bar Code Object            (S)
+    ( D3..CD )    Form Map                   (S)
+    ( D3..BB )    Graphics Object            (S)
+    ( D3..FB )    Image Object               (S)
+    ( D3..92 )    Object Container           (S)
+    ( D3..DF )    Overlay                    (S)
+    ( D3..5F )    Page Segment               (S)
+    ( D3..9B )    Presentation Text Object   (S)
+    ( D3..A8 )    Document                   (S)

End Resource Group (ERG, D3A9C6)

Execute Order Home State
90

| Length | X'D68F' | Flag | CID | Data |
|---|---|---|---|---|

XOH Specify Group Operation (SGO)

| Offset | Type | Name | Range | Meaning | Required |
|---|---|---|---|---|---|
| 0-1 | CODE | Order code | X'0300' | Specify Group Operation (SGO) order code | X'0300' |
| 2 | CODE | Operation | X'00'-X'FF' | Operation identifier reported in XOH OPC X'01' KEEP PAGES TOGETHER X'03' SAVE PAGES | At least one operation |
| 3 | UBIN | Group level | X'00'-X'FF' | Group Level of Boundary groups to which the operation is to be applied. | X'00'-X'FF' |

Delete Saved Page Group (DSPG)

| Offset | Type | Name | Range | Meaning | Required |
|---|---|---|---|---|---|
| 0-1 | CODE | Order code | X'0200' | Delete Saved Page Group (DSPG) order code | X'0200' |
| 2-end of DSPG | | Triplets | | Zero or more Group ID triplets: X'00' Group ID triplet with variable-length group ID | |

94

XOH Define Group Boundary (DGB)

| Offset | Type | Name | Range | Meaning | Required |
|---|---|---|---|---|---|
| 0-1 | CODE | Order code | X'0400' | Define Group Boundary (DGB) order code | X'0400' |
| 2 | CODE | Order type | X'00'<br>X'01' | Define Group Boundary (DGB) order type:<br>Initiate group<br>Terminate group | X'00'<br>X'01' |
| 3 | UBIN | Group Level | X'00'-X'FF' | Group Level | X'00'-X'FF' |
| 4-end of command | | Triplets | See byte description | Zero or more triplets | See byte description |

⎫ 96

Triplets

| Offset | Type | Name | Range | Meaning | Required |
|---|---|---|---|---|---|
| 0 | UBIN | Length | X'02'-X'FF' | Length of the triplet, including itself | X'02'-X'FF' |
| 1 | CODE | Type | X'00' | Triplet type: Group ID | X'00' |
| 2-end of triplet | | Data | See byte description | Data bytes | See byte description |

⎫ 98

Save Pages

Byte 2    X'08', Variable-length group ID code
Bytes 3-n  Variable-length: group ID

*Fig. 8B*

Include Saved Page

| Length | X'D67E' | Flag | CID | Data |

| Offset | Type | Name | Range | Meaning | Required |
|---|---|---|---|---|---|
| 0-3 | UBIN | Page sequence number | X'00000001'- X'FFFFFFFF' | Page sequence number for the page to be included | X'00000001'- X'FFFFFFFF' |
| 4-end of ISP | | Triplets | | One or more ISP triplets: X'00' Group ID triplet with variable-length group ID | |

*Fig. 9*

MO:DCA DATA STREAM

<BRG><BDT,D₀><BPG,P₁>...<BPG,P₁>...<BPG,P_n><EPG,P_n><EDT,D₀><ERG>
<BDT,D₁><BPG;MPG,D₀,P₁;IPG,D₀,P₁;IPG,D₀,P₂>......<IPG,D₀,P_n><EDT,D₁>
<BDT,D₂><BPG;MPG,D₀,P₁;IPG,D₀,P₁;IPO,V₂;EPG><IPG,D₀,P₂>......<IPG,D₀,P_n><EDT,D₂>
<BDT,D_x><BPG;MPG,D₀,P₁;IPG,D₀,P₁;IPO,V_x;EPG><IPG,D₀,P₂>......<IPG,D₀,P_n><EDT,D_x>

*Fig. 11A* ⤴ 250

IPDS DATA STREAM

<SGO,save pages,Lv1>
<DGB,initiate group,Lv1,G₀><BP><EP>...<BP><EP><DGB,terminate group,Lv1,G₀>

<SGO,present as unit,Lv2>
<download overlay V1>
<DGB,initiate group,Lv2,G₁><BP;ISP,G₀,1;IO,V1;EP><BP;ISP,G₀,2;EP>...<BP;ISP,G₀,n;EP><DGB,terminate group,Lv2,G₁>

<download overlay V2>
<DGB,initiate group,Lv2,G₂><BP;ISP,G₀,1;IO,V2;EP><BP;ISP,G₀,2;EP>...<BP;ISP,G₀,n;EP><DGB,terminate group,Lv2,G₂>

<download overlay Vx>
<DGB,initiate group,Lv2,G_x><BP;ISP,G₀,1;IO,Vx;EP><BP;ISP,G₀,2;EP>...<BP;ISP,G₀,n;EP><DGB,terminate group,Lv2,G_x>

*Fig. 11B* ⤴ 252

METHOD AND SYSTEM FOR CACHING AND REFERENCING CACHED DOCUMENT PAGES UTILIZING A PRESENTATION DATA STREAM

BACKGROUND OF THE INVENTION

1. Documents Incorporated by Reference

This invention discloses a method and system which utilize the Mixed Object Document Content Architecture (MO:DCA) data stream and Intelligent Printer Data Stream (IPDS) to cache and access presentation-ready document pages at the printhead. Background material for an understanding of Mixed Object Document Content Architecture (MO:DCA) is incorporated by reference from *Mixed Object Document Content Architecture Reference, IBM Publication* SC31-6802-03, 1994. Background material for an understanding of Intelligent Printer Data Stream (IPDS) is incorporated by reference from *Intelligent Printer Data Stream Reference, IBM Publication* S544-3417-04, 1993.

2. Background Information

The present invention relates in general to document presentation in a production-level Print On Demand (POD) environment and in particular to a method and system for efficiently presenting a document which includes data objects previously processed by a printer. Still more particularly, the present invention relates to an improved method and system for adapting a presentation data stream to cache processed data objects at the printer and subsequently include the cached data objects, with or without variable data and in any order, within a printed document.

3. Description of the Related Art

Presentation architectures are provided for representing documents in a data format which is independent of the methods utilized to capture or create those documents. Documents may contain combinations of text, image, graphics, and/or bar code objects in device and resolution independent formats. Documents may also contain fonts, overlays, and other resource objects, which are required at presentation time to present the data properly. Additionally, documents may also contain resource objects, such as a document index and tagging elements supporting the search and navigation of document data for a variety of application purposes. In general, a presentation architecture for presenting documents in printed format employs a presentation data stream comprising a device-independent application data stream and a device-dependent printer data stream.

Application Data Stream

A data stream is a continuous ordered stream of data elements and objects which conform to a given format. Application programs can generate data streams destined for a presentation service, archive library, or another application program. The Mixed Object Document Content Architecture (MO:DCA) developed by International Business Machines Corporation of Armonk, N.Y. defines a data stream, which may be utilized by applications to describe documents and object envelopes for document interchange and document exchange with other applications and application services. Interchange is the predictable interpretation of shared information in an environment where the characteristics of each process need not be known to all other processes. Exchange is the predictable interpretation of shared information by a family of system processes in an environment where the characteristics of each process must be known to all other processes. Documents which are defined in the Mixed Object Document Content Architecture (MO:DCA) format may be archived in a database, and later retrieved, viewed, annotated, and printed in local or distributed system environments.

A mixed object document is a collection of data objects which comprise the document's content and the resources and formatting specifications that dictate the processing functions to be performed on that content. The term "Mixed" in the Mixed Object Document Content Architecture (MO:DCA) refers to both the mixture of data objects and the mixture of document constructs that comprise the document's components. A Mixed Object Document Content Architecture (MO:DCA) can contain a mixture of presentation objects types, which each have a unique processing requirement. The Mixed Object Document Content Architecture (MO:DCA) is designed to integrate the different data object types into documents that can be interchanged as a single data stream and provides the data stream structures needed to carry the data objects. The MO:DCA data stream also provides syntactic and semantic rules governing the use of objects to ensure that different applications process objects in a consistent manner.

In its most complex form, a Mixed Object Document Content Architecture (MO:DCA) contains data and resource objects along with data structures which define the document's layout and composition features. This form is called a Mixed Object Document Content Architecture (MO:DCA) presentation document. Within such a data stream the Mixed Object Document Content Architecture (MO:DCA) components are defined with a syntax that consists of self-describing structures. Structured fields are the main Mixed Object Document Content Architecture (MO:DCA) structures and are utilized to encode Mixed Object Document Content Architecture (MO:DCA) commands. A structured field typically starts with an introducer that uniquely identifies the command, provides a total length for the command, and specifies additional control information such as whether padding bytes are present. The introducer is then followed by up to 32,759 data bytes. Data may be encoded within the structured field utilizing fixed parameters, repeating groups, key words, and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a one byte length field, a one byte unique triplet identifier, and up to 250 data bytes. Key words and triplets have the same semantics whenever they are utilized. Together these structures define a syntax for Mixed Object Document Content Architecture (MO:DCA) data streams which provide for orderly parsing and flexible extendibility.

The document is the highest level within the Mixed Object Document Content Architecture (MO:DCA) data stream document component hierarchy. Documents may be constructed of pages, and the pages, which are at the intermediate level, may be made up of objects. Objects are at the lowest level and can be bar code objects, graphics objects, image objects and presentation text.

A Mixed Object Document Content Architecture (MO:DCA) document in its presentation form is a document which has been formatted and is intended for presentation, usually on a printer or a display device. A data stream containing a presentation document should produce the same document content in the same format on different printers or display devices dependent, however, on the capabilities of each of the printers or display devices. A presentation document can reference resources that are to be included as part of the document to be presented, which are not present within the document as transmitted within the MO:DCA data stream.

Pages within the Mixed Object Document Content Architecture (MO:DCA) are the level within the document component hierarchy which is utilized to printing or displaying a document's content. Data objects contained within each page envelope in the data stream are presented when the page is presented. Each data object has associated layout information that directs the placement and orientation of the data on the page as well as the measurement units, page width, and page depth.

Objects within the Mixed Object Document Content Architecture (MO:DCA) contain the data which is to be presented. Such objects may also contain environment information needed to establish the proper location and orientation for the data on the presentation surface. Objects in the data stream are bounded by delimiters that identify the object type, such as graphics, image or text. The Mixed Object Document Content Architecture (MO:DCA) supports two categories of objects: data objects and resource objects. In general, data objects consist of data to be presented and the directives required to present it. The content of each type of data object is defined by an object architecture that specifies presentation functions which may be utilized within its coordinate space. All data objects function as equals within the Mixed Object Document Content Architecture (MO:DCA) data stream environment. Data objects are carried as separate entities in the Mixed Object Document Content Architecture (MO:DCA) data stream. Resource objects are named objects or named collection of objects that can be referenced from within the document. In general, referenced resources can reside in an inline resource group that precedes the document in the MO:DCA data stream or in an external resource library and can be referenced multiple times. Resource objects may need to be utilized in numerous places within a document or within several documents. Because resource objects are characterized by an unchanging and often complex composition, it is inefficient and therefore undesirable for applications to generate these objects each time they are required. Instead, the inclusion of resource objects in a library enables applications to retrieve the resource objects as they are needed to obtain the desired presentation effect.

An object container within the Mixed Object Document Content Architecture (MO:DCA) is an envelope for object data that may not be defined by an International Business Machines Corporation presentation architecture and that may not define all required presentation parameters. The container consists of a mandatory Begin/End structured field pair, an optional Object Environment Group (OEG) and mandatory Object Container Data (OCD) structured fields. If an object is to be carried in Mixed Object Document Content Architecture (MO:DCA) resource groups and interchanged, it must, at a minimum, be enveloped by a Begin/End pair, the Object Classification triplet on the Begin structured field must specify the registered object identifier (OID) for the object data format, and the data must be partitioned into OCD structured fields.

Printer Data Stream

A printer data stream within a presentation architecture is a device-dependant continuous ordered stream of data elements and objects conforming to a given format, which are destined for a presentation device. The Intelligent Printer Data Stream (IPDS) architecture developed by International Business Machines Corporation and disclosed within U.S. Pat. No. 4,651,278, which is incorporated herein by reference, defines the data stream utilized by print server programs and device drivers to manage all-points-addressable page printing on a full spectrum of devices from low-end workstation and local area network-attached printers to high-speed, high-volume page printers for production jobs (Print On Demand environments), shared printing, and mailroom applications. The same object content architectures carried in a MO:DCA data stream can be carried in an IPDS data stream to be interpreted and presented by microcode executing in printer hardware. The IPDS architecture defines bidirectional command protocols for query, resource management, and error recovery. The IPDS architecture also provides interfaces for document finishing operations provided by pre-processing and post-processing devices attached to IPDS printers.

The IPDS architecture incorporates several important features. As noted above, since the IPDS architecture supports the similar objects as those carried by the MO:DCA data stream, the IPDS architecture enables the output of multiple diverse applications to be merged at print time so that an integrated mixed-data page, including text, images, graphics, and bar code objects, results. The IPDS architecture transfers all data and commands through self-identifying structured fields that describe the presentation of the page and provide for dynamic management of resources, such as overlays, page segments, and loaded fonts as well as the comprehensive handling of exception functions, thereby enabling a user to control the level of exception handling. Furthermore, the IPDS architecture provides an extensive acknowledgement protocol at the data stream level, which enables page synchronization of the host (e.g., print server) and printer processes, the exchange of query-reply information, and the return to the host of detailed exception information.

Print-On-Demand (POD) Environment

An important application for the application and printer data streams comprising a presentation architecture is a production-level POD environment. A typical POD environment requires the support of high-speed (400 pages per minute) and high-resolution (600 pels per inch) printers at or near rated speed. The performance requirements of a POD environment involves transferring massive amounts of data to the printhead on the order of 30 MB per second.

To achieve the performance required within a POD environment, the presentation architecture must address two potential sources of delays. First, the presentation architecture must address the data bandwidth requirements of the presentation data stream. In particular, it is desirable to maintain or improve current document transmission times while supporting presentation enhancements such as full-color printing and enhanced resolution. The difficulty in improving data stream document transmission times is illustrated by the fact that as the presentation resolution doubles, the data bandwidth must quadruple in order to maintain a comparable transmission time. Secondly, the presentation architecture must minimize the time required by the printer to render the objects within the presentation data stream into a presentation format such as a page bitmap.

State-of-the-art printing systems attempt to minimize transmission delays by temporarily storing print files at the printer for possible subsequent printing. Thus, these printing systems limit transmission overhead by eliminating the need to retransmit a particular print file for which multiple copies are desired. However, state-of-the-art printing systems have several limitations. In particular, state-of-the-art printing systems do not support the recall, manipulation, and incorporation of selected portions of a cached document into a second diverse print file. For example, these printing systems do not allow additional pages to be inserted within the cached print file or unlimited variable data to be merged with a saved page of the cached document. Furthermore, because state-of-the-art printing systems manage saved print files on a document level, they do not support full error recovery for all pages of all copies of the document and full audit and accounting trails on a page level basis.

As should thus be apparent, it would be desirable to provide an improved method and system for the presentation of documents within a POD environment. In particular, it would be desirable to provide an improved method and system for caching document pages at the printhead utilizing the application and printer data streams which comprise a presentation data stream. In addition, it would be desirable to provide an improved method and system for adding variable data to the cached document pages utilizing the application and printer data streams which comprise a presentation data stream.

SUMMARY OF THE INVENTION

It is therefore one object of the present invention to provide improved document presentation in a production-level Print On Demand (POD) environment.

It is another object of the present invention to provide an improved method and system for efficiently presenting a document which includes data objects previously processed by a printer.

It is yet another object of the present invention to provide a method and system for adapting a presentation data stream to cache processed data objects at the printer and subsequently include the cached data objects within a printed document.

It is still another object of the present invention to provide a method and system for adapting a presentation data stream to modify the processed and cached data objects at the printer with variable data and subsequently include the modified cached data objects within a printed document.

The foregoing objects are achieved as is now described. A method and system are disclosed for presenting a document at a presentation device utilizing a presentation data stream comprising a continuous ordered stream of uniquely identified data objects and associated elements which specify format and presentation parameters for each of those data objects. The data stream contains a plurality of documents, including a resource document and a presentation document, which each comprise a collection of the uniquely identified data objects and associated elements. According to the present invention, a save object command structure is defined within a resource document within the presentation data stream. Within the save object command structure, a particular data object is identified. In response to receipt of the save object command structure at the presentation device, the particular data object is stored within storage media. Thereafter, an include saved object command structure is defined within a diverse presentation document within a presentation data stream. The particular data object is identified within the include saved object command structure. In response to receipt of the include saved object command structure at the presentation device, the particular data object is presented within the presentation document, thereby enabling a portion of the resource document stored at the presentation device to be utilized within the presentation document such that presentation efficiency is enhanced. When the saved object structured field occurs within a page object of a presentation document, variable data defined within the page object, including text, images, graphics, and bar code data, are presented in conjunction with the saved data object, thereby enabling data in any format to be contained within the page object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a tabular representation of the syntax of a MO:DCA Include Page (IPG) structured field utilized in accordance with the method and system of the present invention;

FIGS. 3A–3C illustrate listings of the allowed structured fields, including the Include Page (IPG) structured field, within MO:DCA Document, Page Group, and Page objects in accordance within the method and system of the present invention;

FIG. 4 depicts a listing of the structured fields, including a Map Page (MPG) structured field, within a MO:DCA Active Environment Group (AEG) object in accordance with the method and system of the present invention;

FIG. 5 is a tabular representation of the syntax of a MO:DCA Map Page (MPG) structured field utilized in accordance with the method and system of the present invention;

FIG. 6 depicts a listing of the structured fields, including a document structured field within a MO:DCA Resource Group object in accordance with the method and system of the present invention;

FIG. 8A–8C are tabular representations of the syntax of an IPDS Execute Order Home State (XOH) command and Specify Group Operation (SGO), Define Group Boundary (DGB), and Delete Saved Page Group (DSPG) orders, respectively, which are utilized in accordance with the method and system of the present invention;

FIG. 9 is a tabular representation of the syntax of an IPDS Include Saved Page (ISP) structured field utilized in accordance with the method and system of the present invention;

FIGS. 11A and 11B illustrate exemplary MO:DCA and IPDS data streams utilized to cache document pages at a printer and subsequently reference the cached document pages in accordance with the present invention.

DETAILED DESCRIPTION OF PREFERRED EMBODIMENT

System Overview

Figure 1:
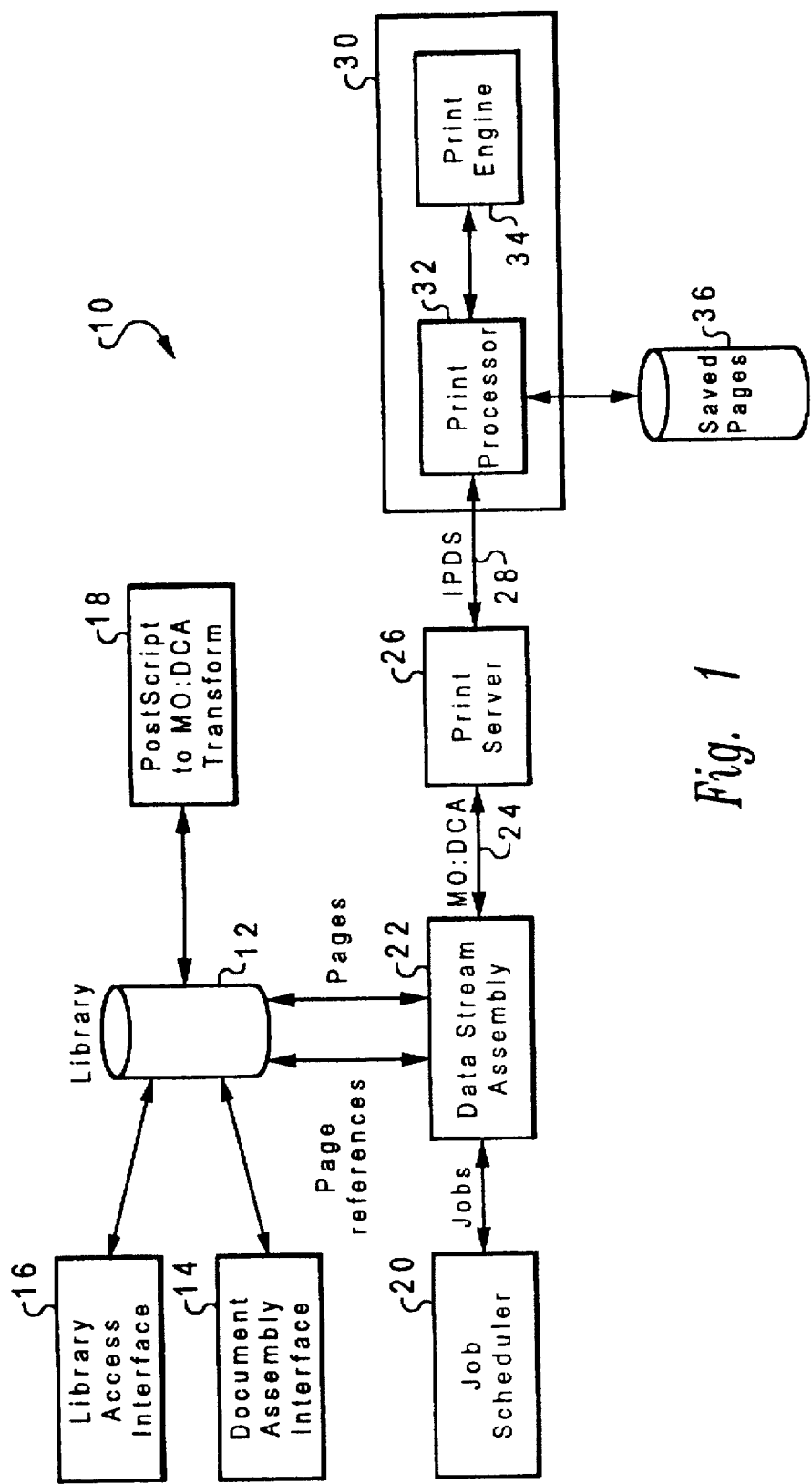
FIG. 1 depicts a pictorial representation of a system model relating Mixed Object Document Content Architecture (MO:DCA) data stream and Intelligent Printer Data Stream (IPDS) to a presentation environment.

With reference now to the figures and in particular with reference to FIG. 1, there is depicted a pictorial representation of a system model relating the Mixed Object Document Content Architecture (MO:DCA) data stream and Intelligent Printer Data Stream (IPDS) to a presentation environment. As illustrated, a presentation system 10 is depicted which includes a library 12 containing documents and other data objects stored in either MO:DCA format or another page description language, such as PostScript® by Adobe Systems, Inc. Utilizing document assembly interface application 14, a user can construct a document that incorporates any of the data objects stored within library 12, including graphics, images, bar code, and text objects. Document assembly interface application 14 preferably comprises a Graphical User Interface (GUI) that enables the user to access, manipulate, and modify the contents of library 12 to construct a document in a graphical and intuitive manner. The user can further retrieve and store data objects within library 12 via library access interface 16.

Presentation system 10 further includes data stream assembly (DSA) application 22, which generates an application data stream destined for a print server 26, or alternatively an archive, facsimile device, or viewing service (not illustrated). Under the direction of job scheduler 20, DSA application 22 builds a MO:DCA print file by including pages of documents stored within library 12 as well as by referencing resource data objects contained within specified pages of library documents. If necessary, data objects utilized within MO:DCA data stream 24 can be converted from another page description language to MO:DCA format by a transform such as PostScript to MO:DCA transform 18. The MO:DCA data stream 24 generated by data stream assembly 22 is transmitted to print server 26, which manages the printing of documents by printer 30. In response to receipt of a MO:DCA print file within MO:DCA data stream 24, print server 26 translates the MO:DCA print file into an Intelligent Printer Data Stream (IPDS) architecture print file for utilization by a device driver to manage all-points-addressable page printing on printer 30. IPDS 28 is received at printer 30 by print processor 32, which comprises a Raster Image Processor (RIP) that renders each page of document data within IPDS 28 into a presentation-ready format (e.g., bit-mapped format). Ordinarily, following the processing of a document page, print processor forwards the page to print engine 34 for presentation. However, according to the present invention, in response to receipt of particular structured fields within IPDS 28, print processor 32 caches processed (e.g., RIPed) document pages in presentation-ready format within storage media 36. Furthermore, in accordance with the present invention, and as described in detail below, in response to receipt of other structured fields within IPDS 28, print processor 32 references the cached document pages stored within storage media 36 as resource objects and incorporates the cached document pages into a document defined within IPDS 28 at print time. By adapting the presentation data stream to include the requisite structured fields to enable the caching and referencing of document pages at printer 30, print engine 34 achieves sufficient data throughput to satisfy the performance requirements of a POD environment. Moreover, by allowing these requisite structured fields to occur within a page that also specifies text, images, graphics, and bar code objects at print processor 32, variable data in any format can be added to saved pages and printed on print engine 34 with acceptable performance.

MO:DCA Data Stream

Referring now to FIG. 2 there is depicted a tabular representation of the syntax of an Include Page (IPG) structured field within MO:DCA data stream 24 utilized in accordance with the method and system of the present invention. As depicted at reference numeral 40, the Include Page (IPG) structured field includes a structured field introducer which specifies the structured field length, an identifier of the structured field, and any flags or bits which may identify whether or not the structured field is segmented or if a structured field extender or padding is to be utilized. The Include Page (IPG) structured field further includes the structured field data which provides the structured field's effect. The syntax for the Include Page (IPG) structured field data is shown at reference numeral 42. As depicted, the syntax of the structured field data is set forth in columnar format and includes an offset value in bytes and the data type of each field, if applicable. A name for the particular field is provided, if applicable and the appropriate range of valid values (if any) for that field are also specified. The meaning or purpose of the data element is set forth under the column "meaning." Finally, an indication of whether or not the field is mandatory or optional and the exception code for the exception conditions which are possible for this data element are also provided.

Thus, as illustrated within FIG. 2, the Include Page (IPG) structured field includes the page name "PgName," which specifies the name of a particular page (qualified by a document name) cached within storage media 36 that is to be included within the document. An Include Page structured field may occur in document state, page-group state, or page state. In all three cases, the referenced page is positioned on the physical media according to the X and Y offsets specified in the active Medium Map. In a preferred embodiment, a referenced page must not contain another Include Page (IPG) structured field (i.e., nesting of IPG structured fields is not permitted).

Next, the Include Page (IPG) structured field includes 8 bytes, which in the depicted embodiment of the present invention are reserved. However, in another embodiment of the present invention, bytes 8–15 of the structured field data specify a page offset and a page orientation for the referenced page. Byte 16 is also set forth to specify control information for the included page. Setting byte 16 to B'10000000' indicates that the referenced page is carried in a document in an external (inline) resource group. As mentioned above, before the referenced page can be included by an IPG structured field, the referenced page must be processed with all required resources and saved within storage media 36 associated with printer 30. This processing includes the application of all text suppressions specified in the Medium Map that is active when the page is cached. Finally, various types of triplets may also be present within the Include Page (IPG) structured field to further characterize and identify the referenced page. One required triplet is the fully qualified name of the document that contains the referenced page. Thus, referenced page names must be unique within a document, but can be repeated between documents. Optionally, a triplet can also be present that specifies a replacement qualified name to be utilized as the name of the referenced page. Lastly, an optional triplet can be present which specifies a code page utilized to decode the document and page names.

With reference now to FIGS. 3A–3C, there are illustrated the structure of three objects within the document component hierarchy of MO:DCA. As mentioned above, the Include Page (IPG) structured field can be included in Document state, Page Group state, and Page state. Referring first to FIG. 3A, there is depicted a listing of the allowed structured fields within a Document object or Document state delimited by a Begin Document (BDT) and End Document (EDT) structured field pair. Similarly, with reference to FIG. 3B, there is depicted a listing of the allowed structured fields, including an Include Page (IPG) structured field, within a Page Group object or Page Group state delimited by a Begin Named Page Group (BNG) and an End Named Page Group (ENG) structured field pair. Finally, referring to FIG. 3C, there is illustrated a listing of the allowed structured fields, including an Include Page (IPG) structured field, within a Page object or Page state delimited by a Begin Page (BPG) and an End Page (EPG) structured field pair. In each of FIGS. 3A–3C, brackets ('[]') indicate the optionality of a structured field, (S) indicates the repeatability of a structured field, and a plus sign ('+') preceding a structured field indicates the unrestricted ordering of the structured field with respect to other structured fields so marked. It is important to note that when an Include Page (IPG) structured field occurs in page state, the presentation-ready format of the referenced page is merged with the data defined for the current page within the other structured fields of the page object. Accordingly, the page referenced by the Include Page (IPG) structured field must be mapped in the Active Environment Group (AEG) object for the current page, which describes the presentation environment for the page so that the included page can be downloaded along with other resources such as fonts and overlays (electronic forms) prior to processing the current page. Thus, as depicted within FIG. 4, the Active Environment Group (AEG) object contains a Map Page (MPG) structured field, which identifies a page that is to be merged with the data specified for the current page.

With reference now to FIG. 5, there is illustrated a tabular representation of the syntax of a Map Page (MPG) structured field within MO:DCA utilized in accordance with the method and system of the present invention to specify a page resource required to print the page. It is important to note that the Map Page (MPG) structured field is only needed if the Include Page (IPG) is specified in Page state and variable data is to be incorporated into the page. As depicted at reference numeral 50, the Map Page structured field includes a structured field introducer which specifies the structured field length, an identifier of the structured field, a set of flags, and the structured field data which provides the structured field's effect. The syntax for the Map Page (MPG) structured field data is shown at reference numeral 52. Like the syntax of the Include Page (IPG) structured field, the syntax of the Map Page (MPG) structured field is presented in columnar format and includes an offset, a type, a name, a range, a meaning or purpose, an indication of whether the field is mandatory or optional, and the exception code possible for the particular data element within the structured field. Thus, as indicated within FIG. 5, the Map Page (MPG) structured field carries the MPG data in the form of triplets specified within a single repeating group. The "RGLength" field specifies the total length of the repeating group, including the length of the RGLength parameter itself. Various types of triplets are present within the repeating group to further characterize and identify the page referenced by the Include Page (IPG) structured field. One required triplet is a fully qualified name triplet that specifies the name of the document which contains the page to be included by the Include Page (IPG) structured field. The other required triplet is a fully qualified name of the page to be included by the IPG structured field. An optional triplet may also be present which specifies a code page utilized to decode the document and page names.

As described above, cached pages incorporated into a document by an Include Page (IPG) structured field are referenced as resource objects, that is, objects which are explicitly referenced from a presentation document instead of being directly included within the presentation document. Resource objects may be specified within a resource group object that contains a collection of resource objects, including overlays, page segments, and referenced data objects, including cached documents. Thus, as depicted within FIG. 6, the MO:DCA External Resource Group object includes one or more resource documents carried within the resource group of a print file. Documents are carried as resource objects in a resource group to facilitate the efficient processing and storage of the documents within storage media 36 for subsequent retrieval utilizing an Include Page (IPG) structured field.

Figure 7:
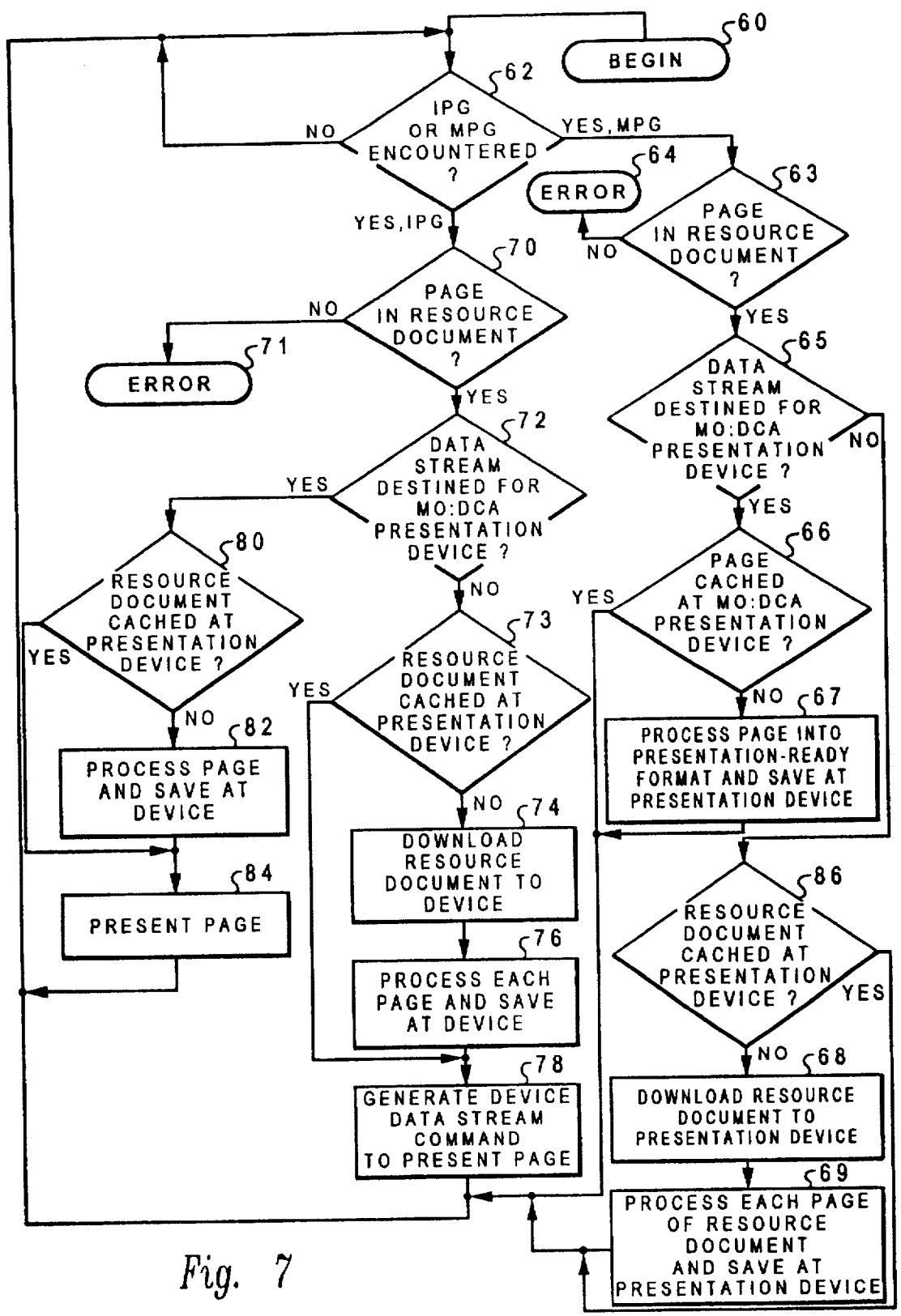
FIG. 7 is a high level logic flowchart illustrating the processing of MO:DCA Include Page (IPG) and Map Page (MPG) structured fields within a data processing system to implement the method of the present invention.

With reference now to FIG. 7, there is illustrated a high level logic flowchart which illustrates a process for implementing the presentation data stream structured fields described above within a data processing system in accordance with the present invention. As illustrated, the process begins at block 60 and thereafter passes to block 62. Block 62 depicts a determination of whether or not an Include Page (IPG) or Map Page (MPG) structured field has been encountered. If not, the process merely iterates until an Include Page (IPG) or Map Page (MPG) structured field is encountered.

Still referring to block 62, in the event a Map Page (MPG) structured field is encountered, the process passes to block 63, which illustrates a determination of whether or not the page name referenced within the Map Page (MPG) structured field is within the specified resource document. If not, the process passes to block 64 and terminates with the data processing system generating an exception message indicating that the current document includes an improper reference to a saved page. Returning to block 64, if a determination is made that the referenced page is within the specified resource document, the process passes to block 65. Block 65 depicts a determination of whether or not the MO:DCA data stream is received as an input for presentation by a MO:DCA presentation device. Some presentation devices, for example, display devices such as the Advanced Function Presentation (AFP) Viewer developed by IBM Corporation, support the presentation of documents within a MO:DCA data stream by parsing the structured fields within the MO:DCA data stream and directly presenting the described data objects. If a determination is made at block 65 that the MO:DCA data stream is received as an input of a MO:DCA presentation device, the process passes to block 66, which illustrates a determination of whether or not the resource document page referenced by the Map Page (MPG) structured field is cached at the presentation device. If so, the process simply returns to block 62. If not, the process proceeds from block 66 to block 67, which depicts processing the referenced page of the resource document into a presentation-ready format, such as a raster image or command list, and storing the referenced page of the resource document in the presentation-ready format at the MO:DCA presentation device. Thereafter, the process returns to block 62.

Referring again to block 65, if a determination is made that the destination of the presentation data stream is a presentation device other than a MO:DCA presentation device, for example, printer 30, which utilizes an IPDS, the process passes to block 86. Block 86 depicts a determination of whether or not the resource document containing the page referenced within the Map Page (MPG) structured field is cached at the presentation device. If so, the process returns to block 62. However, if the resource document is not cached at the presentation device, the process passes to blocks 68 and 69. Block 68 depicts the data processing system (e.g., print server 26) downloading the resource document containing the page referenced within the Map Page (MPG) structured field to the presentation device (e.g., printer 30). Then, as illustrated at block 69, the presentation device processes each page within the resource document into a presentation-ready format and stores each page at the presentation device. Because the resource document containing the referenced page is downloaded to the presentation device, processed into a presentation-ready format, and saved at the presentation device in response to receipt of a Map Page (MPG) structured field, only minimal processing is required to include the referenced page within a presentation document upon receipt of a presentation data stream command which references the same resource document page. Thereafter, the process returns to block 62.

Referring again to block 62, in the event an Include Page (IPG) structured field is encountered, the process passes to block 70, which depicts a determination of whether or not the referenced page is within the specified resource document. If not, the process passes to block 71, which depicts the process terminating following the generation of an exception message indicating that the current document includes an improper reference to a saved page. However, if at block 70 a determination is made that the referenced page is within the specified resource document, the process passes to block 72, which illustrates a determination of whether or not the presentation data stream is received as an input for presentation by a MO:DCA presentation device. If not, the process passes to block 73, which depicts a determination of whether or not the specified resource document is cached at the presentation device. If so, the process proceeds directly to block 78. However, if the resource document is not cached at the presentation device, the process proceeds to block 74, which depicts downloading the resource document containing the referenced page to the presentation device. As illustrated at block 76, the presentation device then processes each page within resource document into a presentation-ready format and stores each page at the presentation device. The process then proceeds to block 78, which depicts the generation of a device data stream command to present the referenced page. For example, in presentation system 10 depicted within FIG. 1, block 78 represents print server 26 translating the MO:DCA data stream, including the Include Page (IPG) structured field into an IPDS architecture Include Saved Page (ISP) command. As will be described below, the IPDS Include Saved Page (ISP) command is utilized to direct print processor 32 to incorporate a cached resource document page stored within storage media 36 into the current page of a presentation document being printed. Thereafter, the process returns to block 62 in the manner which has been described.

Referring again to block 72, if a determination is made that the presentation data stream is received as an input of a MO:DCA presentation device, the process passes to block 80, which illustrates a determination of whether or not the resource document page referenced by the Include Page (IPG) structured field is cached at the MO:DCA presentation device. If so, the process proceeds to block 84. If a determination is made that the referenced page is not cached at the MO:DCA presentation device, the process proceeds from block 80 to block 82, which depicts processing the referenced page of the resource document into a presentation-ready format, such a raster image or command list, and storing the referenced page of the resource document in the presentation-ready format at the MO:DCA presentation device. The process then passes from either block 80 or block 82 to block 84, which illustrates presenting the referenced page within the MO:DCA presentation device in conjunction with other data objects, if any, contained within the presentation document page which contains the referenced page. Thereafter, the process returns to block 62.

Upon reference to the foregoing those skilled in the art will appreciate that the MO:DCA structured fields set forth herein may be utilized to specify a particular data object within a data stream to be saved at a presentation device for subsequent presentation. Furthermore, the MO:DCA structured fields set forth above may be utilized to reference various resource data objects cached at a presentation device which will then be automatically incorporated into the presentation of a document. In this manner resource data objects transmitted within a presentation data stream to a presentation device may be incorporated within multiple diverse documents, with or without variable data and in any order, without a requirement that the resource data objects be transmitted within the presentation data stream multiple times.

Intelligent Printer Data Stream (IPDS)

With reference now to FIG. 8A, there is illustrated a tabular representation of the syntax of an Execute Order Home State (XOH) Specify Group Operation (SGO) Save Pages command utilized in accordance with the method and system of the present invention. This operation directs the print processor 32 to process each page of the specified group of pages normally and report data stream exceptions, but to save each page within storage media 36 rather than printing each page. The pages of the specified group are each assigned a page sequence number by print processor 32 and are stored together with the variable-length group ID specified in the XOH Defined Group Boundary (DGB) command (described below) that delimits the group. The page to be saved is processed along with all of the required resources, for example, fonts, overlays, and page segments, so that the resources can be deactivated following page processing. In addition, all data stream syntax checking is performed for the page to be saved and all overlays included within the page and appropriate exceptions are reported to print server 26. The pages are consecutively assigned four-byte page sequence numbers in ascending order.

As illustrated at reference numeral 90, a generic Execute Order Home State (XOH) command includes a length field that specifies the length of the command, a command field that specifies the command, a flag byte that specifies whether an acknowledgement of the command by the printer is required, a correlation ID field which supplies an identifier for the command utilized when the printer returns an acknowledge reply, and a data field that specifies a particular order to be performed and zero or more parameter bytes. The data field syntax for a XOH Specify Group Operation (SGO) is shown at reference numeral 92. As illustrated, the syntax for the SGO operation is set forth in columnar format and includes an offset value and bytes, the type of field, the name of each field, the range of acceptable values for the field, the meaning or purpose of each field, and an indication of whether or not the field is required.

As illustrated at reference numeral 92 of FIG. 8A, the XOH SGO order includes a SGO order code that specifies that a group operation is to be performed. In addition, the XOH SGO contains a one byte operation identifier, which according to the present invention includes the Save Pages operation specified by a X'03' operation identifier. Furthermore, the XOH SGO command contains a group level, which specifies the group of pages upon which the specified operation is to be performed. In a preferred embodiment of the present invention, another XOH SGO operation identifier is defined which causes print processor 32 to keep the pages of a group together for printing. Another possible extension of the XOH SGO command enables a page to be both scheduled for printing and saved at the presentation device. Thus, pages within a specified group can be presented and cached in response to receipt of a single presentation data stream command.

According to an important feature of the present invention, when synchronous data stream exceptions are encountered while saving a group of pages in response to receipt of an XOH SGO Save Pages command, the Execute Order Anystate (XOA) Exception-Handling Control (EHC) command functions as if the pages were being printed. Thus, partial pages or full pages can be saved by the print processor 32 with appropriate exception highlighting. When asynchronous exceptions are encountered while receiving data for a page to be saved, the incomplete page is discarded. Also, as part of the recovery for an asynchronous non-storage exception, all incomplete groups of saved pages are discarded.

Referring now to FIG. 8B, there is depicted a tabular representation of the syntax of a XOH Define Group Boundary (DGB) command utilized in accordance with the method and system of the present invention to delimit a group of pages to be saved at the printer. Like the previously described XOH SGO command, the XOH DGB command has the generic syntax structure shown at reference numeral 90 of FIG. 8A. The syntax of the data field of the XOH command is shown within FIG. 8B at reference numeral 96. As illustrated, the syntax of the XOH DGB data field includes a Define Group Boundary (DGB) order code, an order type which specifies whether the DGB order initiates or terminates a group, and a one byte group level that identifies the group being defined. A precise hierarchical order defines the group level such that a group can contain groups of lesser group levels but cannot contain groups of equal or greater group levels. In addition, zero or more triplets are also set forth that contain information about the operation specified by a preceding XOH SGO command. Each group operation defines the relationship among the triplets.

The format of the triplets is set forth at reference numeral 98 of FIG. 8B. As illustrated, the triplets comprise a length field that specifies the length of the triplet, including the length field itself, a type field that must specify the triplet type as a group ID, and a data element. According to the present invention, an XOH DGB command following an XOH SGO command, that is, a DGB command that initiates a group of pages to be saved, has a triplet data element syntax as set forth at reference numeral 98 of FIG. 8B. Thus, the triplet data element specifies that the data elements is a variable-length group ID code followed a variable number of bytes of binary group ID. Preferably, to promote uniformity with the MO:DCA data stream previously described, the variable-length group ID is typically the qualified document name utilized in the MO:DCA data stream.

With reference now to FIG. 8C, there is depicted a tabular representation of an Execute Order Home State (XOH) Delete Saved Page Group operation utilized in accordance with the method and system of the present invention to delete a specified group of pages cached at the printer. Like the XOH Specify Group Operation described above with reference to FIG. 8A, the Delete Saved Page Group (DSPG) operation utilizes the command syntax illustrated at reference numeral 90 of FIG. 8A. However, as depicted at reference numeral 94 of FIG. 8C, the XOH DSPG operation is specified by a different XOH data field. Thus, as illustrated within FIG. 8C, the XOH DSPG operation includes an order code field which specifies the XOH DSPG order code X'0200' and a variable length triplet field. The triplet field contains zero or more group ID triplets that contain a variable-length group ID of a group of saved pages to be deleted. If no triplets are specified within the triplet field, all saved page groups are deleted. If a group ID of a saved page group to be deleted is not found, an exception is generated by the printer and transmitted to the host (e.g., print server 26).

Referring now to FIG. 9, there is depicted a tabular representation of the syntax of an IPDS Include Saved Page (ISP) command utilized to reference a cached page for incorporation into a presentation document in accordance with the method and system of the present invention. As depicted at reference numeral 100, the include saved page (ISP) command includes a length field that specifies the length of the command, a command field that specifies the IPDS ISP command code, a flag field that contains the IPDS command stream flags which indicate whether an acknowledgement of the command by the printer is requested, and a correlation ID that specifies an identifier for the command. The correlation ID is an optional field which is present only if the flag field is set to indicate that a correlation ID is included in the Include Saved Page (ISP) command. If a command so specifies, when the printer reports a synchronous exception in response to a command containing a correlation ID, the printer returns a negative acknowledge reply and the correlation ID for the command on which the exception occurred. Finally, the IPDS command includes a data field which contains specific orders, parameters, and data appropriate for the given command. The syntax for the data field of the Include Saved Page (ISP) command is shown at reference numeral 102. As depicted, the syntax is set forth in columnar format and includes an offset value in bytes and the data type of each field, if appropriate. In addition, a name and range of valid values for the field are specified, if appropriate. The meaning or purpose of the field is set forth under the column "meaning." Finally, the syntax includes a "required" column that indicates the field range that must be supported by any printer which supports the command. A printer can support values outside the required range, but the values for the command must remain within the architecturally valid range.

Thus, as illustrated within FIG. 9, the Include Saved Page (ISP) command includes a page sequence number field that specifies the page sequence number for the page to be included. As described above, the page sequence number is a four byte unsigned binary number utilized by print processor 32 to uniquely identify a referenced page within a particular document. In order to correctly translate page names within MO:DCA Include Page (IPG) structured fields into IPDS page sequence numbers within Include Saved Page (ISP) commands, print server 26 maintains a mapping table between MO:DCA page names and IPDS sequence numbers. addition, one or more ISP triplets are set forth, including a requisite group ID triplet that uniquely identifies the group containing the referenced page. Thus, print processor 32 also contains a mapping between the MO:DCA qualified document names and IPDS groups. In contrast to MO:DCA Include Page (IPG) structured fields, IPDS ISP commands must be sandwiched between Begin Page (BP) and End Page (EP) command pairs in order to maintain page synchronization between a presentation device (e.g., printer 30) and a host process (e.g., print server 26). Page synchronization between the presentation device and the host process enables per page error recovery as well as full audit and accounting.

Upon reference to the foregoing description of the IPDS data stream, those skilled in the art will appreciate that the XOH Specify Group Operation (SGO), XOH Define Group Boundary, XOH Delete Saved Page Group (DSPG), and Include Saved Page (ISP) commands set forth herein may be utilized to specify particular document pages within a data stream to save at the printer, to delete specified groups of saved pages, and to incorporate saved pages within a document. In this manner, document pages of a resource document may be incorporated into multiple diverse documents at print time, with or without variable data and in any order, without a requirement that the resource document pages be retransmitted and reprocessed for each use. Furthermore, because the document pages are stored as a resource at the printer, like fonts, overlays, and other resources, extensions may also be made to other commands which access and manipulate printer resources. For example, the Execute Order Anystate (XOA) Request Resource List (RRL) command, which requests information about a printer s current resources, can be extended to request information from a printer about page groups cached at the printer.

Figure 10:
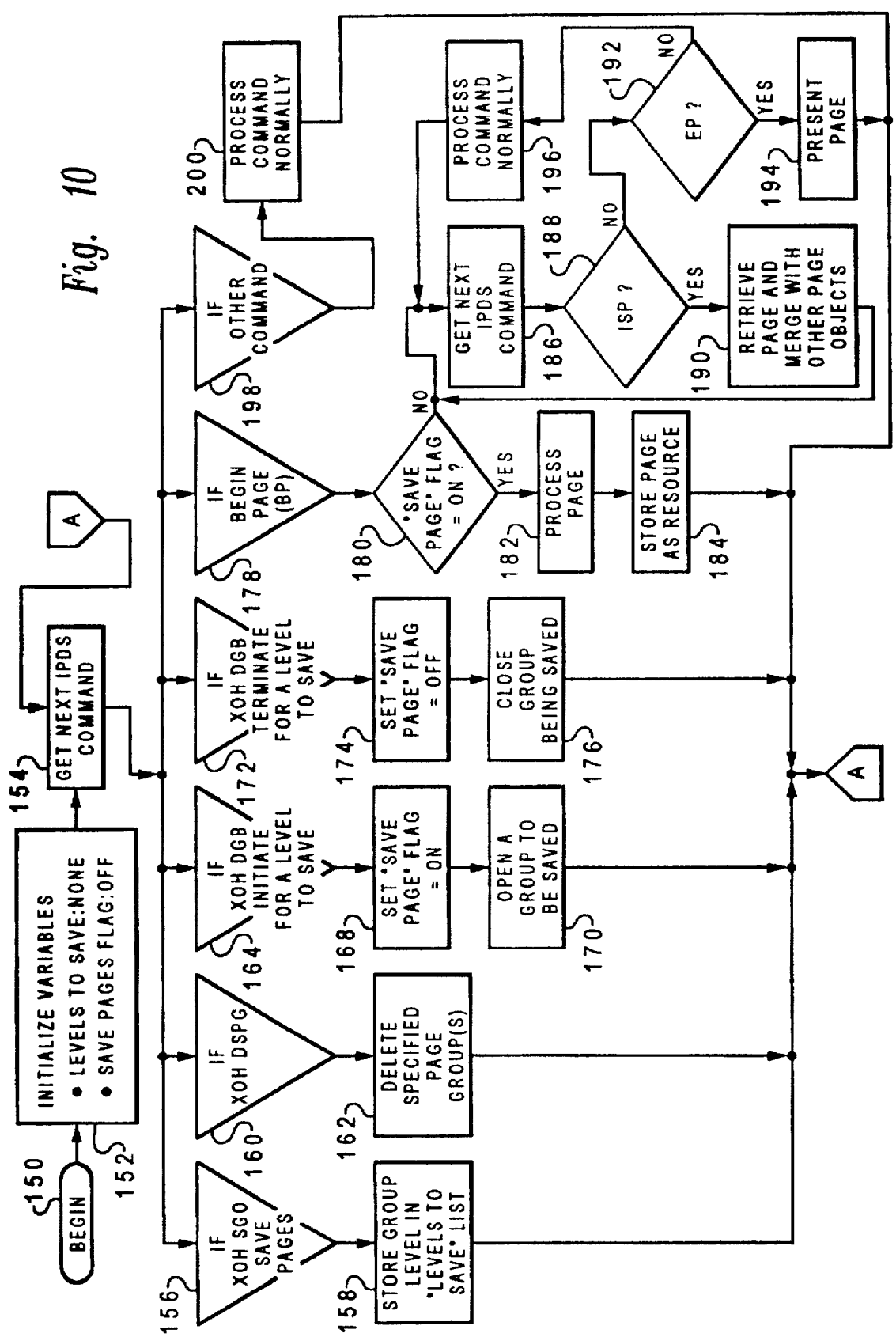
FIG. 10 is a high level logic flowchart illustrating the processing of IPDS Include Saved Page (ISP), XOH SGO, XOH DGB, and XOH DSPG commands within a data processing system in accordance with the method of the present invention.

With reference now to FIG. 10, there is depicted a high level logic flowchart which illustrates a process for implementing the method of the present invention within a presentation system utilizing the IPDS data stream. As illustrated, the process begins at block 150 and thereafter proceeds to block 152, which depicts the presentation device, for example, print processor 32, initializing presentation variables. Presentation variables initialized at block 152 include a "levels to save" variable, which lists the group level numbers of page groups to be saved, and a "save pages" flag, which when set indicates that a page delimited by a Begin Page (BP) and End Page (EP) command pair should be saved. Next, the process passes to block 154, which illustrates receiving the next IPDS command to be processed. Following block 154, a number of processing paths are available, depending upon which command is received at block 154.

If the command received at block 154 is determined at block 156 to be an XOH SGO Save Pages command, the process passes to block 158, which depicts the presentation device storing the group level specified by the XOH SGO Save Pages command within the "levels to save" list. The process then returns to block 154 via page connector A. As illustrated at block 160, if the command is an XOH DSPG command, the process proceeds from block 154 to block 162, which illustrates deleting the specified saved page group or groups from storage media 36 associated with printer 30. Thereafter, the process passes to page connector A and returns to block 154. If a determination is made at block 164 that the command received at block 154 is an XOH DGB Initiate Group command that delimits a group having a group level number that is stored within the "levels to save" list, the process passes from block 164 to block 168, which depicts setting the "save page" flag. The process then passes to block 170, which illustrates print processor 32 opening a group of pages to be saved within storage media 36, and returns to block 154 via page connector A. As illustrated at block 172, if the command received at block 154 is an XOH DGB Terminate Group command, the process passes from block 154 to blocks 174–176, which depict clearing the "save page" flag and closing the group being saved within storage media 36. Thereafter, the process passes to page connector A and returns to block 154.

Referring now to block 178, if a determination is made that a Begin Page (BP) command is received at block 154, the process passes to block 180, which illustrates a determination of whether or not the "save page" flag is set. If so, the process passes from block 180 to blocks 182–184, which depict print processor 32 processing the page into a presentation-ready format, such as a bitmap image, and storing the presentation-ready page as a resource document page within storage media 36. The process then returns through page connector A to block 154. Returning to block 180, if a determination is made that the "save page" flag is not set, meaning that the current document is a presentation document and not a resource document, the process passes to block 186, which illustrates receiving the next IPDS command. If the next IPDS command is an Include Saved Page (ISP) command, the process passes to block 190, which depicts retrieving the referenced resource document page by page sequence number and variable-length group ID and merging the referenced page data with other data objects specified within the page commands. The process then returns to block 186. Referring again to block 188, if the received command is not an Include Saved Page (ISP) command, the process proceeds to block 192, which illustrates a determination of whether or not the received command is an End Page (EP) command. If so, the process passes to block 194, which depicts presenting the presentation document page, for example, by printing the presentation document page at print engine 34. The process then returns to block 154 via page connector A. If a determination is made at block 192 that the received command is not an End Page (EP) command, the process passes to block 196, which depicts print processor 32 processing the command as usual. The process then proceeds from block 196 to block 186, which has been described. Finally, referring to block 198, if the command received at block 154 is none of the commands tested for at blocks 156, 160, 164, 172, and 178, print processor 32 processes the command in the normal manner. Thereafter, the process returns to block 154 via page connector A.

Exemplary Implementation of Page Caching at a Presentation Device

Referring now to FIG. 11A and 11B, there are depicted representations of a MO:DCA data stream and an IPDS utilized to print documents within a Print On Demand (POD) environment according to the method and system of the present invention. In the depicted scenario, multiple copies of document $D_O$ are to be printed with different variable data appearing on the first page of each of X copies. Assume that document $D_O$ contains n pages, numbered $P_1$–$P_n$. Furthermore, assume $D_x$ generates the xth copy and modifies $P_1$ with variable overlay $V_x$. Thus, in presentation system 10 of FIG. 1, the user would utilize document assembly interface application 14 to specify and position variable overlay $V_x$ on $P_1$ of each copy of document of $D_O$. Then utilizing pages and page references within library 12, data stream assembly application 22 would generate the MO:DCA print file for print server 26 shown at reference numeral 250 of FIG. 11A. As illustrated, document $D_O$ is carried within MO:DCA data stream 24 as an inline resource group delimited by a Begin Resource Group (BRG) and End Resource Group (ERG) structured field pair. As is further illustrated at reference numeral 250, each of the n pages of document $D_O$, which is delimited by a Begin Document (BDT) and End Document (EDT) structured field pair, is delimited by a Begin page (BPG) and End page (EPG) structured field pair.

Next, X documents are set forth delimited by Begin Document (BDT) and End Document (EDT) structured field pairs. Page $P_1$ of each of the x documents is delimited by a Begin Page (BPG) and an End Page (EPG) structured field pair and contains an Include Page (IPG) structured field that references $P_1$. Because the IPG structured field occurs in page state, the first page further includes a Map Page (MPG) structured field in the Active Environment Group (AEG) of the page to identify $P_1$. Because the remaining pages of document $D_x$ (i.e., pages $P_2-P_n$) are referenced from document state, the IPG structured fields are not delimited by BPG and EPG structured fields and do not require a MPG structured field. The first page of each copy of the document further includes an Include Page Overlay (IPO) that specified the variable overlay $V_x$ to be included with the page $P_1$.

In response to receipt of the MO:DCA print file depicted at reference numeral 250, print server 26 begins processing the structured fields in the first document to be presented, which is document $D_1$. When print server 26 encounters a Map Page (MPG) or an Include Page (IPG) command that references a page in document $D_O$, document $D_O$ is translated into an IPDS page group that is to be processed into presentation-ready format and saved. Because documents $D_1-D_x$ contain only MO:DCA Include Page (IPG) commands and because only a single copy of each document is specified, print server 26 simply translates IPG structured fields into IPDS ISP commands. Print server 26 maintains page synchronization with print processor 32 by mapping MO:DCA page names $P_1-P_n$ to IPDS page sequence numbers. Print server 26 also maps MO:DCA document names $D_O-D_x$ to IPDS group IDs $G_O-G_x$.

With reference now to FIG. 11B, there is illustrated the IPDS print file corresponding to the MO:DCA print file depicted at reference numeral 250 of FIG. 11A. As illustrated at reference numeral 252, the IPDS print file begins with an XOH SGO Save Pages command to instruct print processor 32 that the first page group, delimited by a Define Group Boundary (DGB) Initiate Group and Terminate Group pair that specifies group name $G_O$, should be processed and cached within storage media 36. Each of the pages within group $G_O$ is delimited by a Begin Page (BP) command and an End Page (EP) command pair. Following group $G_O$ is an optional XOH SGO command instructing print processor 32 to present the following group to the user as a unit and a variable overlay $V_1$ to be incorporated within page sequence number 1 of group $G_1$. Next, group $G_1$, delimited by a DGB command pair that specifies the group name, is received. Page sequence number 1, delimited by a BP and EP pair, contains an Include Saved Page (ISP) and an Include Overlay (IO) command to specify that page sequence number 1 and overlay $V_1$ are to be presented with the page. The remaining pages within group $G_1$ consist only of Include Saved Page (ISP) commands, which specify the referenced page sequence number within $G_O$ to be presented, bounded by BP and EP command pairs. As depicted at reference numeral 252, the remaining groups $G_2-G_x$ are structured similarly to group $G_1$. The functions described above may also be utilized to implement many other POD scenarios, including inserting new pages in each presented copy of a fixed document, deleting selected pages from each presented copy of a fixed document, and building composite presentation documents from two or more fixed documents.

Upon inspection of print files 250 and 252, those skilled in the art will appreciate the dramatic decrease in the size of presentation data stream print files afforded by the present invention as compared with those of prior art presentation systems. As a result, the transmission time of the print files is correspondingly reduced. Furthermore, because the pages within the resource documents are processed only once (prior to caching the pages), processing time for subsequent documents which reference pages of cached resource documents is also greatly reduced.

As has been described, the present invention provides an improved method and system for presenting documents within a presentation system which enable document pages specified within a presentation data stream to be cached at the presentation device for subsequent incorporation, with or without variable data and in any order, into a presentation document. Although the present invention has been described with reference to a preferred embodiment which utilizes the MO:DCA and IPDS data streams developed by International Business Machines Corporation, those skilled in the art will recognize that the teachings of the present invention may readily be incorporated into other presentation data stream architectures. In particular, those skilled in the art will appreciate that the functions implemented in the foregoing description utilizing particular structured fields and commands may be implemented within other embodiments of the present invention utilizing diverse structured fields and commands. For example, the MO:DCA Include Page (IPG) and Map Page (MPG) structured fields described above are utilized invoke the processing and storage of resource document page at a presentation device. The "save pages" function accomplished utilizing these structured fields can therefore be viewed generically as a "save pages" structured field although such a structured field is not explicitly utilized within MO:DCA. Furthermore, although a preferred embodiment of the present invention is implemented within a Print On Demand (POD) environment, those skilled in the art will appreciate that the present invention may also be employed within other presentation environments which utilize diverse presentation devices, including visual and audio presentation devices.

While the invention has been particularly shown and described with reference to a preferred embodiment, it will be understood by those skilled in the art that various changes in form and detail may be made therein without departing from the spirit and scope of the invention.

What is claimed is:

1. A method for presenting a document at a presentation device utilizing a presentation data stream comprising a continuous ordered stream of uniquely identified data objects and associated elements which specify format and presentation parameters for each of those data objects, wherein said data stream contains a plurality of presentation documents which each comprise a collection of said uniquely identified data objects and associated elements, said presentation device having storage media, said method comprising the steps of:

defining a save object command structure within a first presentation document within said presentation data stream;

identifying a particular data object within said save object command structure;

in response to receipt of said save object command structure at said presentation device, storing said particular data object within said storage media;

thereafter, defining an include saved object command structure within a second diverse presentation document within a presentation data stream;

identifying said particular data object within said include saved object command structure; and in response to receipt of said include saved object command structure at said presentation device, presenting said particular data object within said second document, wherein a portion of said first document stored at said presentation device may be utilized within said second document such that presentation efficiency is enhanced.

2. The method for presenting a document at a presentation device of claim 1, and further comprising:

prior to storage of said particular object within said storage media, processing said particular data object into a presentation-ready format.

3. The method for presenting a document at a presentation device of claim 2, wherein said step of processing said particular data object into a presentation-ready format comprises processing said particular data object into a raster image.

4. The method for presenting a document at a presentation device of claim 1, wherein said particular data object comprises a page of said first presentation document.

5. The method for presenting a document at a presentation device of claim 4, wherein said step of presenting said particular data object comprises printing a page of said second presentation document containing said page of said first presentation document.

6. The method for presenting a document at a presentation device of claim 5, wherein said page of said second presentation document includes both said page of said first presentation document and a data object contained within said second presentation document.

7. The method for presenting a document at a presentation device of claim 1, and further comprising:

in response to a presentation error during presentation of said second document, performing error recovery on a per page basis.

8. The method for presenting a document at a presentation device of claim 1, said presentation data stream comprising both a device-independent application data stream and a device-dependent presentation device data stream, said presentation device being coupled to a presentation server for data communication, said method further comprising:

in response to receipt of said application data stream at said presentation server, translating said application data stream into said presentation device data stream; and in response to said translation, transmitting said presentation device data stream to said presentation device.

9. The method for presenting a document at a presentation device of claim 1, and further comprising:

thereafter, in response to receipt of a delete saved object command structure within a presentation data stream which specifies said particular data object, removing said particular data object from said storage media.

10. The method for presenting a document at a presentation device of claim 1, wherein data objects, including said particular data object, that are stored within said storage media comprise resources, said method further comprising:

thereafter, performing resource management of said resources stored within said storage media on a per page basis.

11. The method for presenting a document at a presentation device of claim 1, and further comprising:

performing an accounting of said presentation of said second document on a per page basis.

12. A system for presenting a document at a presentation device utilizing a presentation data stream comprising a continuous ordered stream of uniquely identified data objects and associated elements which specify format and presentation parameters for each of those data objects, wherein said data stream contains a plurality of presentation documents which each comprise a collection of said uniquely identified data objects and associated elements, said presentation device having storage media, said system comprising:

means for defining a save object command structure within a first presentation document within said presentation data stream;

means for identifying a particular data object within said save object command structure;

means for storing said particular data object within said storage media in response to receipt of said save object command structure at said presentation device;

means for thereafter defining an include saved object command structure within a second diverse presentation document within a presentation data stream;

means for identifying said particular data object within said include saved object command structure; and means for presenting said particular data object within said second document in response to receipt of said include saved object command structure at said presentation device, wherein a portion of said first document stored at said presentation device may be utilized within said second document such that presentation efficiency is enhanced.

13. The system for presenting a document at a presentation device of claim 12, and further comprising:

means for processing said particular data object into a presentation-ready format prior to storage of said particular object within said storage media.

14. The system for presenting a document at a presentation device of claim 13, wherein said means for processing said particular data object into a presentation-ready format comprises means for processing said particular data object into a raster image.

15. The system for presenting a document at a presentation device of claim 12, wherein said particular data object comprises a page of said first presentation document.

16. The system for presenting a document at a presentation device of claim 15, wherein said means for presenting said particular data object comprises means for printing a page of said second presentation document containing said page of said first presentation document.

17. The system for presenting a document at a presentation device of claim 16, wherein said page of said second presentation document includes both said page of said first presentation document and a data object contained within said second presentation document.

18. The system for presenting a document at a presentation device of claim 12, and further comprising:

means for performing error recovery on a per page basis in response to a presentation error during presentation of said second document.

19. The system for presenting a document at a presentation device of claim 12, said presentation data stream comprising both a device-independent application data stream and a device-dependent presentation device data stream, said presentation device being coupled to a presentation server for data communication, said system further comprising:

means for translating said application data stream into said presentation device data stream in response to receipt of said application data stream at said presentation server; and means for transmitting said presentation device data stream to said presentation device in response to said translation.

20. The system for presenting a document at a presentation device of claim 12, and further comprising:

means for thereafter removing said particular data object from said storage media in response to receipt of a delete saved object command structure within a presentation data stream which specifies said particular data object.

21. The system for presenting a document at a presentation device of claim 12, wherein data objects, including said particular data object, that are stored within said storage media comprise resources, said system further comprising:

means for thereafter performing resource management of said resources stored within said storage media on a per page basis.

22. The system for presenting a document at a presentation device of claim 12, and further comprising:

means for performing an accounting of said presentation of said second document on a per page basis.

* * * * *